E. B. Bigelow.

Carpet Loom.

Sheet 1 - 6 Sheets.

No 144.

Reissued Sept. 11, 1849.

E. B. Bigelow.

Carpet Loom.

Sheet 2 - 6 Sheets.

No 144.

Reissued Sept. 11, 1849.

E. B. Bigelow.

Carpet Loom.

Sheet 3 - 6 Sheets.

No. 144.

Reissued Sept. 11, 1849.

E. B. Bigelow.
Carpet Loom.
Sheet 4 - 6 Sheets.
No 144.
Reissued Sept. 11, 1849.
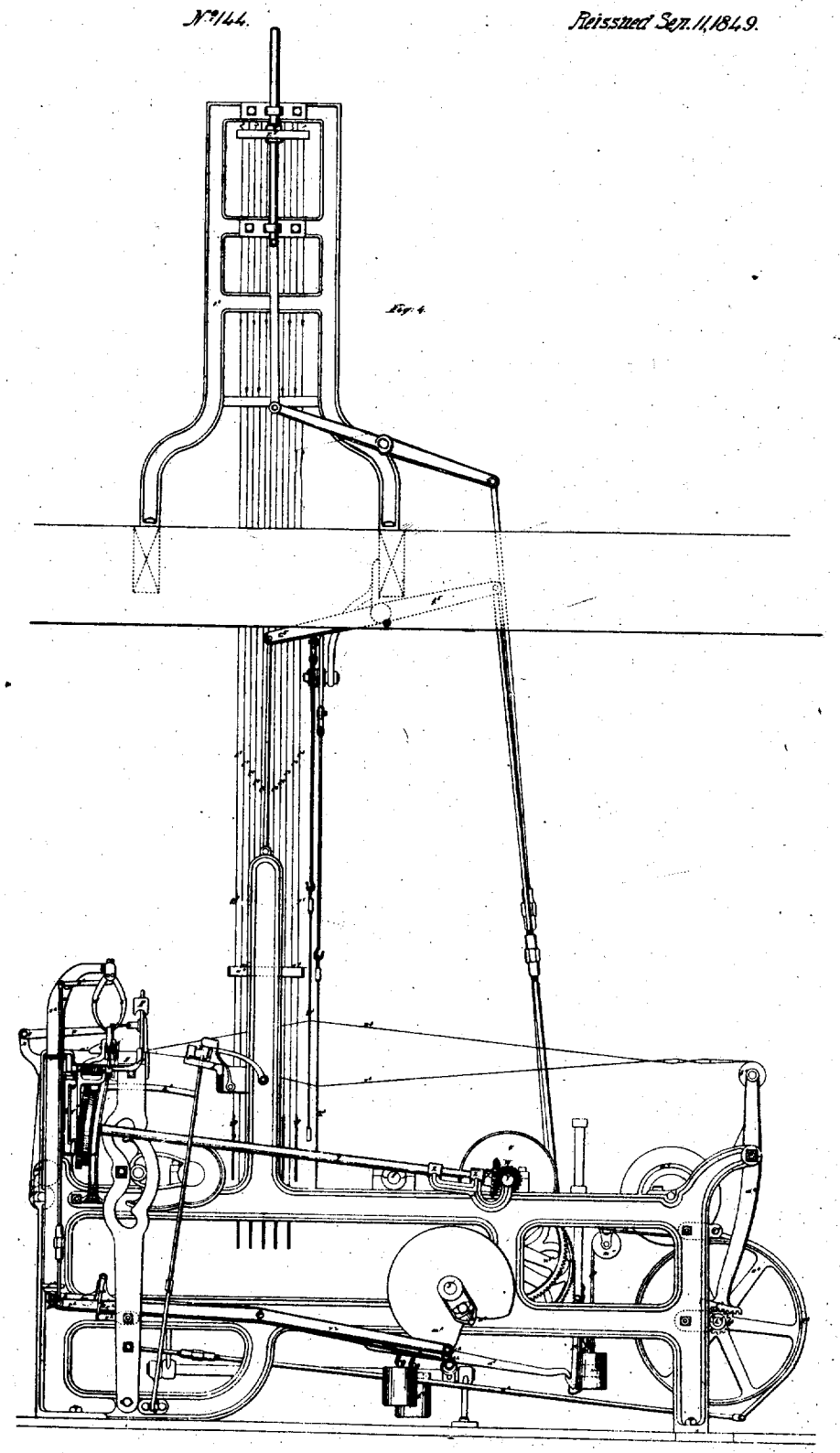

E. B. Bigelow.
Carpet Loom.
Sheet 5 - 6 Sheets.
No 144.
Reissued Sept. 11, 1849.
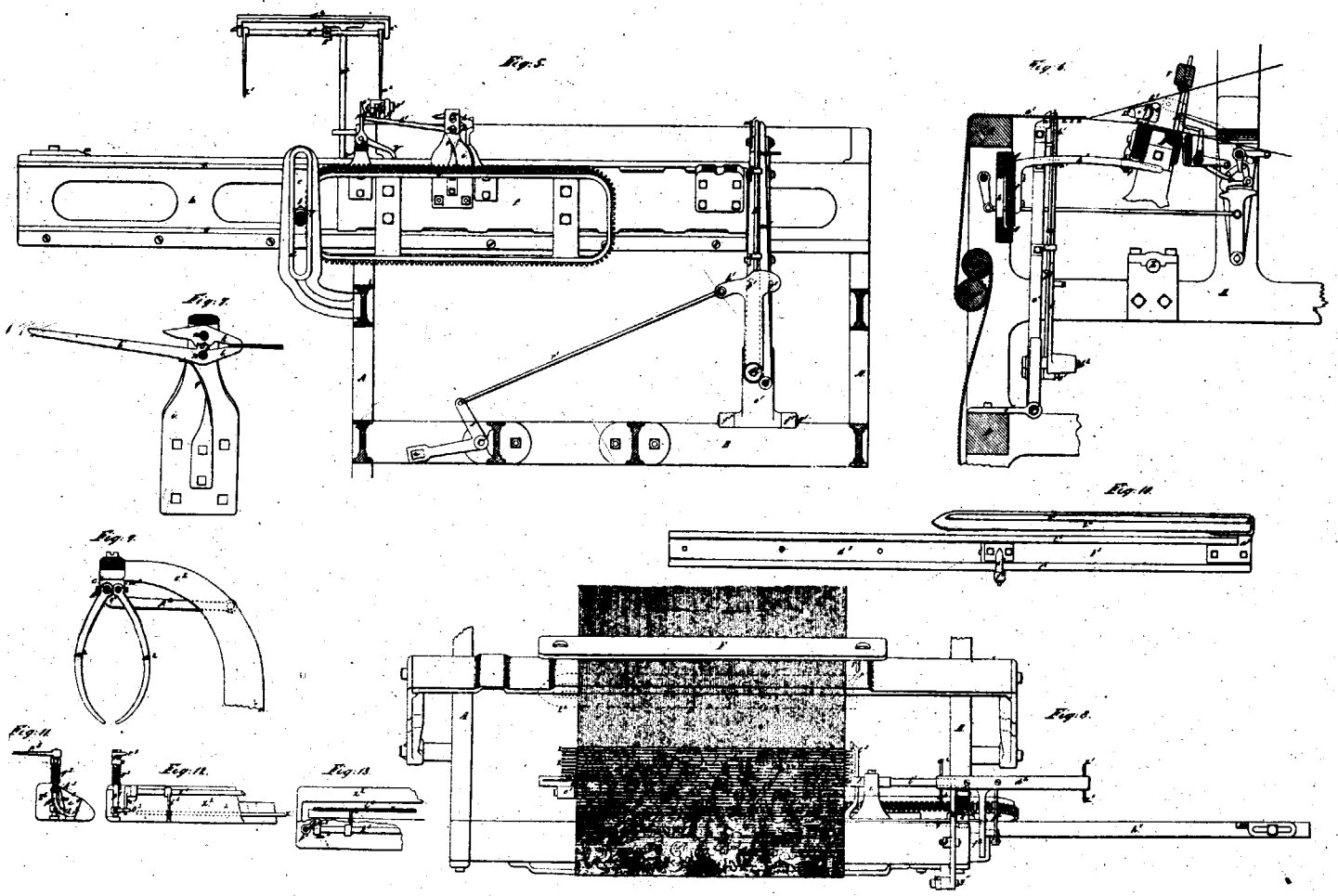

E. B. Bigelow.

Carpet Loom.

Sheet 6-6 Sheets.

No 144.

Reissued Sept. 11, 1849.

UNITED STATES PATENT OFFICE.

E. B. BIGELOW, OF BOSTON, MASSACHUSETTS.

IMPROVEMENT IN BRUSSELS LOOMS.

Specification forming part of Letters Patent No. 5,020, dated March 20, 1847; Reissue No. 144, dated September 11, 1849.

*To all whom it may concern:*

Be it known that I, ERASTUS B. BIGELOW, of Boston, in the county of Suffolk and State of Massachusetts, have invented certain new and useful Improvements in Machinery for Weaving Brussels Carpeting or such other Fabrics as may be Successfully Produced Thereby; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1:
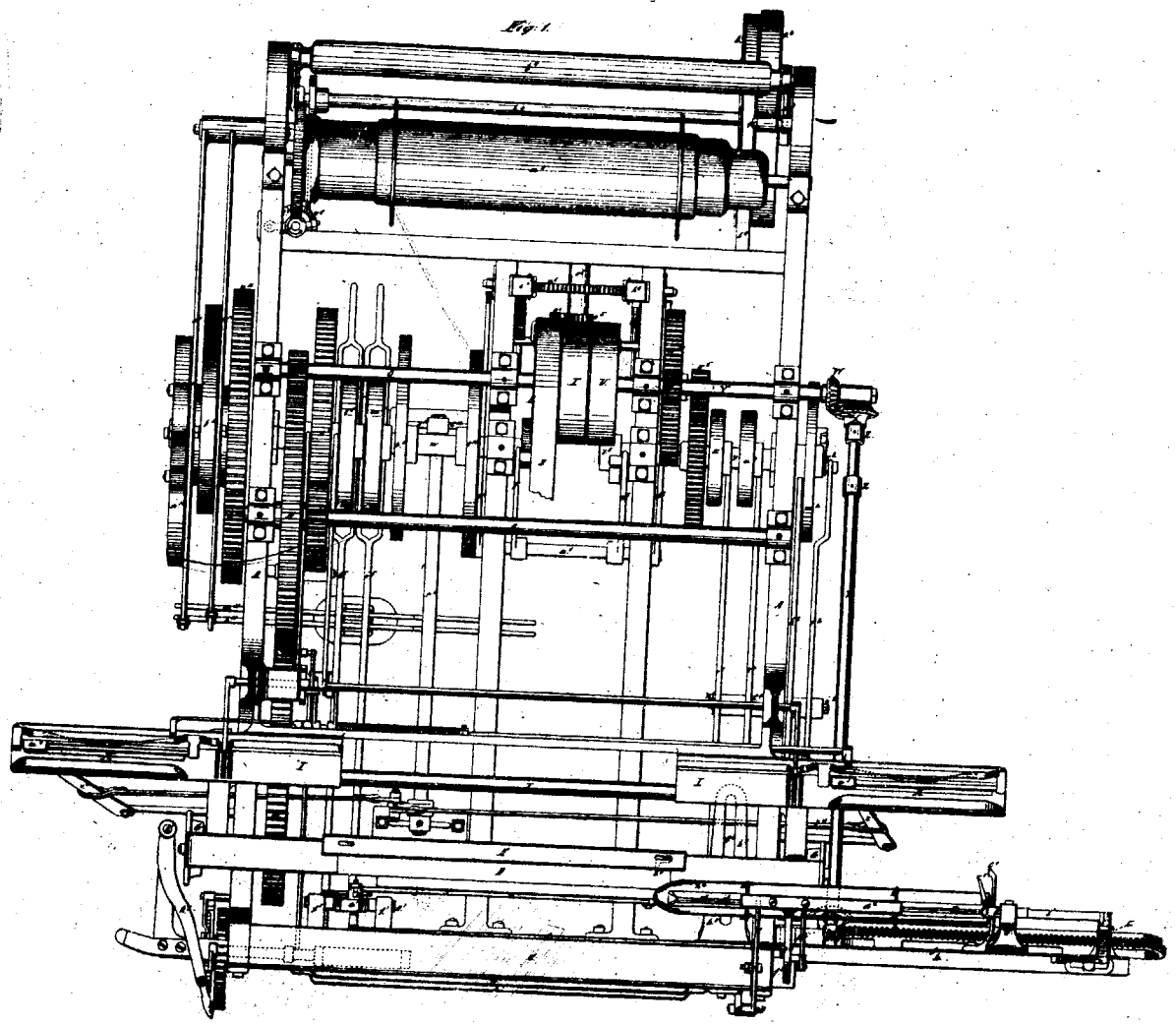
Figure 2:
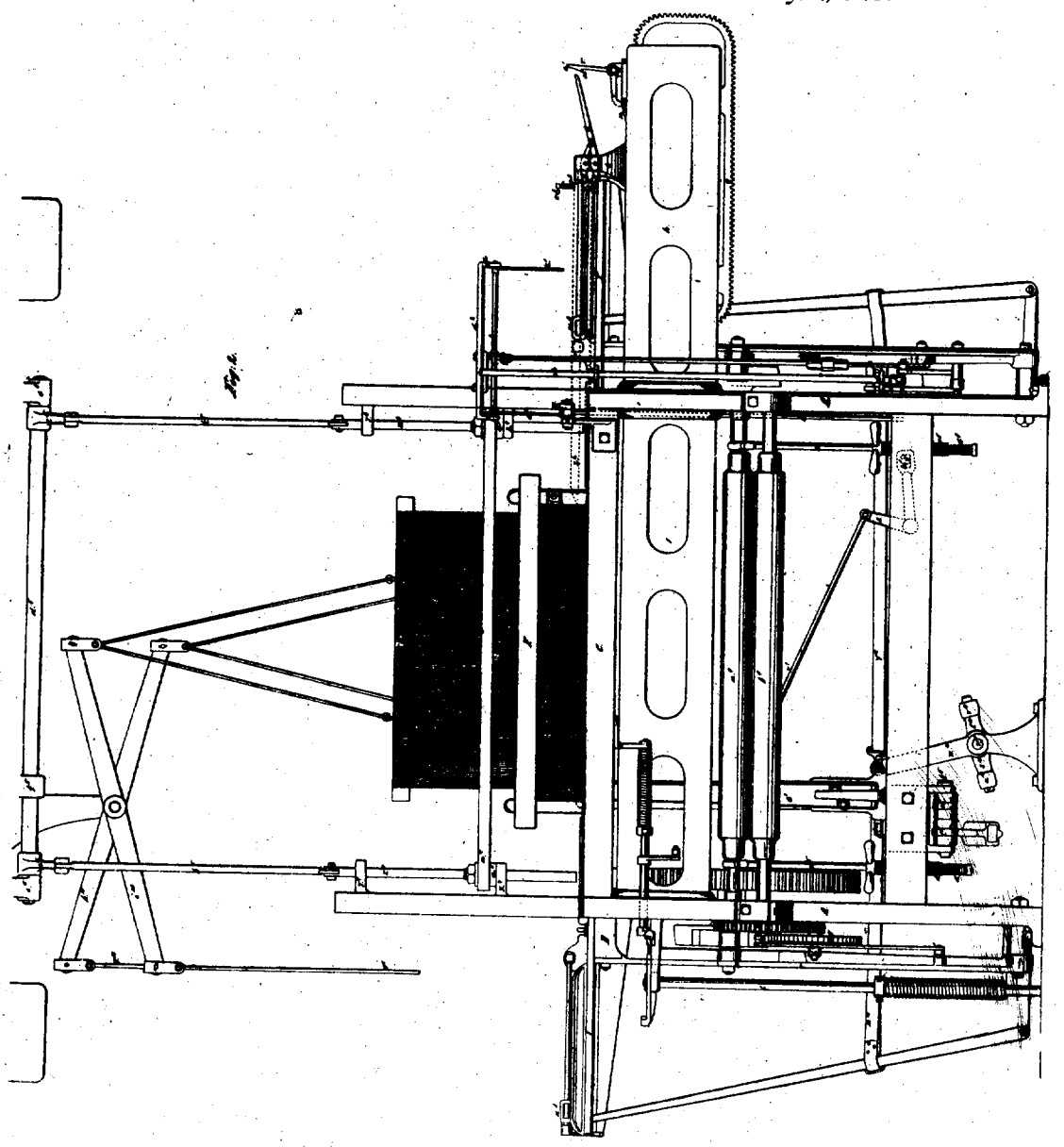
Figure 3:
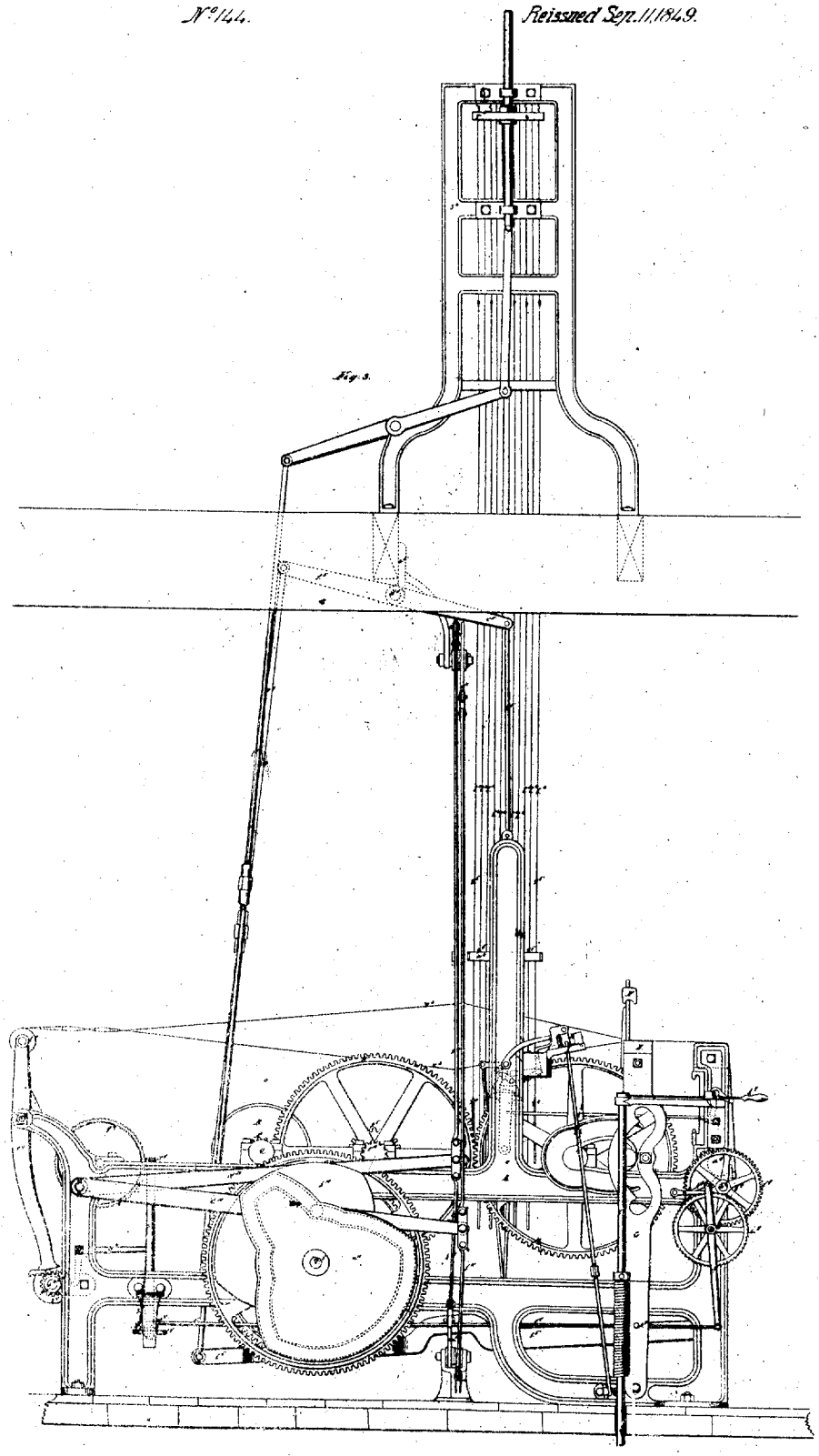

Figure 1 is a plan; Fig. 2, a front elevation; Fig. 3, an elevation of the left side, representing the jacquard-frame as connected with the loom, and Fig. 4 a like elevation of the right side.

The other figures will be referred to in their appropriate places.

The same letters indicate like parts in all the figures.

The character of the first part of my invention consists in making the mechanism which weaves the cloth or forms the body of the fabric separate, and having a distinct organization from the mechanism which operates the figuring-wires, removes them from under the pile or figuring-loops, and introduces them under the open figuring-warp, each of these having a distinct and separate organization, and being operated separately and connected by an intermediate mechanism, which starts one of them as it arrests the other by shifting what communicates the motive power from the one to the other.

The second part of my invention consists in combining with a loom for weaving looped fabrics over wires a box, trough, or the equivalent thereof, into which the figuring-wires are to be deposited preparatory to introducing them under the figuring-warps.

The third part of my invention consists in taking the figuring-wires from the apparatus which receives them from under the pile or figuring-loops by means of fingers or their equivalents, and transferring them to the box, trough, or the equivalent thereof, preparatory to their being introduced under the figuring-warps.

The fourth part of my invention consists in combining with the mechanism which withdraws the figuring-wires from under the pile or figuring-loops the mechanism for transferring the said wires to the trough or the equivalent thereof, from which or by which they are transferred to the open shed of the figuring-warps.

The fifth part of my invention consists in the method of introducing the figuring-wires under the figuring-warps and then dropping them by means of a box, into which they have previously been dropped, which box, or the equivalent thereof, is carried under the figuring-warps, there drops the wires and moves back; and the last part of my invention consists in supporting the figuring-wires between the warps while being introduced under the figuring-warps.

In the accompanying drawings, A A represent the two sides of a properly-adapted frame, connected by suitable cross-ties, B. The lay, with its race-beam D, reed E, reed-bar F, and swords G G, but without shuttle-boxes, is made and operated as represented in the drawings and in manner corresponding with that described in the Letters Patent granted to me on the 18th day of August, 1846, for my improved loom for weaving ingrain carpeting, or these may be made in any other appropriate manner, as this makes no part of my present invention. The cams that operate the lay are on the cam-shaft L, on which there is a cogged wheel, M, that engages with another cogged wheel, N, (on an intermediate shaft, O,) that receives motion from a pinion, P, on the driving-shaft Q of this part of the machinery. On the intermediate shaft, O, there is a pinion, $p^5$, which drives by the cogged wheel $o^5$ the shaft $n^5$, to which it is attached, and on this shaft are the two picker-cams $p^{10}$ $q^{10}$, that alternately act on rollers $u^{10}$ $v^{10}$ on the ends of arms $s^{10}$ $t^{10}$ of a horizontal arbor, $r^{10}$, to the other end of which is attached an arm, $w^{10}$, for the purpose of operating the pickers $u^3$ by means of the picker-staffs $v^3$, connected with it by the straps $y^{10}$ $x^{10}$. This same shaft $n^5$ carries two other cams, $m^5$ and $s^5$, the one, $s^5$, for the purpose of depressing a lever, $l^5$, that turns on a fulcrum-pin $k^5$ on the lower cross-bar, B, and this lever is connected at $h^5$ by a rod, $g^5$, with an arm, $f^5$, on an upper horizontal shaft, $d^5$, that has its bearings in the boxes $e^5$ $e^5$, from which project two other arms, $c^5$ $c^5$, and opposite to the one $f^5$, and to these two arms are suspended the movable comber-board, $u^4$, by the two connecting-rods $b^5$, and the slide-rods $x^4$ $x^4$, that slide in bearings $y^4$ $y^4$ and $z^4$ $z^4$, the rods $x^4$ $x^4$ having shoulders to sustain the comber-board in its lowest position. The cam is so formed as to depress the lever to elevate the comber-board for the purpose of elevating the figuring-warps at the required time that the common harness may work the linen or foundation warp without interfering with the figuring-warps. This method of elevating the figuring-warp has been secured to me by Letters Patent granted for improvements in the manner of mounting the loom, &c., and bearing date the 30th of May, 1842, to run for fourteen years from the 1st of May, 1842, in the specification of which will be found a full, clear, and exact description of the nature and object of the invention and the mode of operation. There is another lever, $i^5$, similar to and by the side of the lever $l^5$, and operated by the cam $m^5$, which is connected with and operates the jacquard. On the said intermediate shaft, $v$, there is another pinion, $o^{10}$, which engages with a cog-wheel, $n^{10}$, on a tubular arbor that runs on a stud projecting from the frame, and to this are attached the two harness-cams $a^{10}$ and $b^{10}$, that operate the harness $y^3$ by the usual connection of levers $c^{10}$ $d^{10}$, connecting-rods $e^{10}$ $g^{10}$, and second levers $l^{10}$ $m^{10}$. The woven fabric is taken up after passing over the breast-beam C by passing between two rollers, $a^9$ $b^9$, the upper one, $a^9$, being used to make pressure on the other (to insure the drawing of the fabric) by means of two rods that pass through one of the cross-ties B, and provided with helical springs $d^9$ $d^9$, and the lower one, $b^9$, receives the regular take-up motion to insure the regularity of the figures, the apparatus which gives this motion consisting of a cogged wheel, $f^9$, on the roller $b^9$, which engages with a pinion, $g^9$, on the arbor of a ratchet-wheel, $i^9$, operated at each beat of the lay by a hand, $k^9$, on the end of a lever, $l^9$, connected with one sword of the lay at $p^9$ by a jointed connecting-rod, a pawl, $n^9$, being employed to prevent the ratchet-wheel from turning back. The linen or foundation warp $w^3$ $x^3$ is given out from the warp-beam $a^4$ by a connecting-rod, $o^9$, one end of which is jointed to the sword of the lay at the same point, $p^9$, to which the take-up motion is connected, the other end being jointed to one end of a lever, $u^9$, that turns freely (as represented by dotted lines in Fig. 3) on a vertical arbor, $s^9$, which has a crown ratchet-wheel, $t^9$, actuated at each beat of the lay by a hand, $v^9$, on the opposite end of the lever $u^9$, and as this ratchet-wheel and arbor are turned motion is given to the warp-beam by an endless screw, $r^9$, on the upper end of the arbor, the threads of which take into the cogs of a spur-wheel, $q^9$, on the shaft of the warp-beam.

For the purpose of regulating the let-off motion, the foundation-warps from the warp-beam pass over a whip-roller, $b^4$, that has its bearings in the upper end of two levers, $c^4$ $d^4$, that vibrate on centers $e^4$, and the lower end of each of these levers is provided with a segment-rack, $f^4$, the teeth of which engage with pinions $g^4$ on each end of a shaft, $h^4$, and on this shaft there is a cam, $z^9$, against the periphery of which one arm (represented by dotted lines in Fig. 3) of a lever, $w^9$, that turns on a stud-pin, $x^9$, bears, the other arm of this lever being connected with the ratchet-hand $v^9$ by a chain, $y^9$, and the diameter of this cam is such that so long as the end of the lever $w^9$ bears on its greatest diameter the ratchet-hand is held up and does not act on the ratchet-wheel to turn the warp-beam and give out the warp; but so soon as the tension of the warps becomes so great on the roller $b^4$ as to overcome the force of a weight, $n^4$, attached to one end of a strap, $l^4$, that passes over a roller, $m^4$, and is attached to and extends partly around the periphery of a brake-wheel, $o^4$, on the before-mentioned shaft $h^4$. This shaft is turned and brings the reduced diameter of the cam to the arm of the lever, which permits the ratchet-hand to act on the ratchet-wheel and give out the warp, so that the giving out of the warp is entirely regulated by its tension on the roller $b^4$, over which it passes. This mode of giving out the warp I do not claim, and the same end may be accomplished by other known means.

To prevent the lay, when beating up the weft, from causing the warp-beam to give out warp, there is a brake, $p^4$, fitted to the periphery of the brake-wheel $o^4$, with one end jointed at $q^4$ to the frame and the other by a connecting-rod, $r^2$, to the sword G of the lay, so that as the lay beats up the brake is drawn up to the brake-wheel, and holds fast the let-off motion.

I have thus far described the general organization of that part of the mechanism which is employed in forming the foundation and weaving in the fabric, in which I make no claim to invention, as the several movements of which it is composed are well known; but in the arrangement the parts are so located, generally, on one side as to leave free space for the location and operation of the second part of the mechanism, or that which is employed in operating the figuring-wires.

The shuttle-boxes K K, instead of being attached to and making part of the lay, are permanently attached to the sides of the frame by means of the plates I I, the ends of the race-board of the lay being properly adapted to pass under them when the lay is thrown back, so that the shuttle can pass over the race-board back and forth from one shuttle-box to the other.

Before proceeding to the description of the second part of the mechanism I will simply state that the jacquard-frame $s^4$ is applied in the usual manner, and so located as to have the cords $t^4$, &c., (through the mails of which the figuring-warps pass,) in front of the harness $y^3$ $z^3$, that works the linen or foundation warps. These cords pass through holes in the movable comber-board, and are provided each with a knot, $q^3$, so that by lifting the comber-board all the figuring-warps are lifted up clear of the foundation-warps to admit of working these without interruption from the figuring-warps.

At the commencement of each operation the first part of the mechanism is set in motion to weave the foundation-web in the usual manner of weaving ordinary cloth, which therefore needs no further description than that given above, as this part of the mechanism makes no part of my present invention, except so far as I have given it an organization and arrangement which adapts it to the second part of the mechanism, so that the two shall work in succession.

During the first series of operations the comber-board $u^4$ is lifted by the cam $s^5$ to raise the jacquard-harness, and in like manner the jacquard is operated by the cam $m^5$ to raise that portion of the figuring-warp which is to form the figuring loops or pile at the next operation, these two operations being performed by the first part of the mechanism; and at the end of the weaving-in operations, and before the first part of the mechanism is arrested, the comber-board is permitted to descend to let down that portion of the figuring-warp which is not to form the surface, and so soon as this is effected the first part of the mechanism is arrested, and the second part started by the following arrangement, more particularly represented in Figs. 14, 15, 16, and 17, Plate 6.

On the shaft $n^5$ of the jacquard and comber-board cams there is a cam-formed arm, $c^6$, which gradually lifts an arm, $b^6$, projecting from an arbor, $a^6$, and which then, by its form, permits it to fall back to its original position by the force of a weight, $f^6$, on another arm or lever, $d^6$, on the same arbor. The end of this weighted lever is hook-formed, and in descending catches onto a pendent hook, $l^6$ $z^6$, Fig. 4, jointed at $m^6$ to a vertically-sliding rack, $h^6$, provided with cogs on two of its faces, those on one face engaging with a cogged wheel, $n^6$, that turns on the stud-pin $o^6$, and those on the other face engaging the cogs of a sector-rack, $t^6$, that turns on a stud-pin, $v^6$. As the lever $d^6$ draws down the rack $h^6$ it turns the cogged wheel $n^6$, on the arbor of which there is a pinion, $p^6$, that engages with a sector-rack, $q^6$, that vibrates on the stud-pin $r^6$, and to this is attached a belt-shifter, $s^6$, so that the descent of this rack shifts the driving-belt $s$ from the pulley R on the driving-shaft Q of the first part of the mechanism, and transfers it to the driving-pulley U or the driving-shaft V of the second part of the mechanism, which is thus started as the first part is arrested. As the driving-belt is shifted from one driving-pulley to the other it passes over a loose pulley, T, to prevent strain on the mechanism, and at the same time it is necessary to arrest the momentum of the machinery from which the driving-power has been removed. This is effected by the sector-rack $t^6$, to the hub of which there is a short arm, $x^6$, connected by means of an adjustable connecting-rod, $y^6$, with a brake, $z^6$, which is thus forced against the inner periphery of the driving-pulley to arrest by friction all the moving parts.

On inspection of the drawings, it will be seen that there is a like arrangement of parts on the other side for the purpose of shifting the driving-belt back from the second to the first part of the mechanism, in which $y^5$ is the cam-formed arm that acts on the arm $z^5$ of the arbor $a^6$, from which projects the weighted lever $e^6$ that catches on the pendent hook to draw down the double rack $i^6$ to vibrate the cogged wheel $n^6$ and sector-rack $u^6$ that operates the brake $a^7$ within the pulley R by the connecting-rod $y^6$. As the levers $d^6$ and $e^6$ move together and alternately act on the pendent hooks that one of the sliding double racks may be lifted as the other is drawn down, provision is made alternately to place the pendent hooks out of the way, which is effected in the following manner, viz: As the pendent hook is drawn down by the lever $d^6$, a pin (represented by dotted lines in Fig. 17) that projects from the pendent hook runs within the flanges of a plate, $a^7$ $b^7$ $c^7$, and in front of a spring, $e^7$, attached to the plate by screws $f^7$ $g^7$ $h^7$, and at the end of the downward motion forces back the spring and gets behind it, so that when the lever $d^6$ is moved down at the next operation by the lever $e^6$, which operation carries up the pendent hook, it (the hook) is carried back to avoid catching the end of the lever by the curved form of the spring, and, so soon as it passes above the top of the spring, it is forced forward to catch the end of the lever at the next operation by a spring, $i^7$, attached to the rack. The first part of the mechanism having been stopped and the figuring-warps placed in a condition to receive the wires over which the figuring-loops are to be formed, and the driving-belt shifted to the pulley U on the driving-shaft V of the second part of the mechanism, the second series of operations commence, which are for introducing a wire under that portion of the figuring-warp which is to be formed into loops, at the same time drawing out a wire from under the wrought figure, and then transferring this wire to the apparatus which is to introduce it under the figuring-warp at the next operation.

Figure 11:
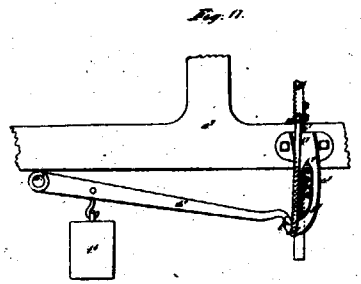
Figure 12:
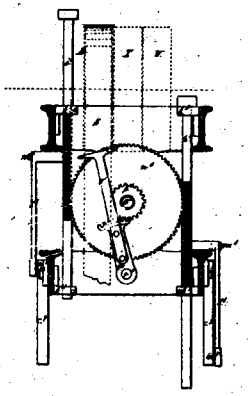
Figure 14:
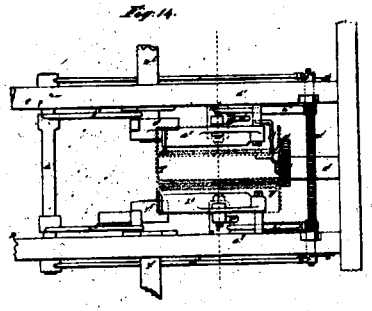
Figure 15:
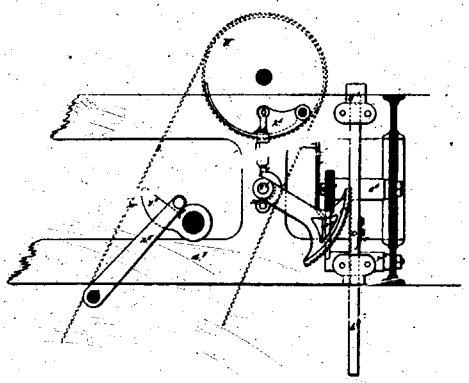

The details of the arrangement of the apparatus for operating the figuring-wires are more closely represented on Plate 5, Fig. 5, being a vertical cross-section taken in front of the lay, looking from the back; Fig. 6, a vertical section taken in the direction of the warps; Fig. 7, a section taken through and in the length of the pinchers; Fig. 8, a horizontal section taken just above the lay; Fig. 9, a vertical section taken through the arbors of the fingers for transferring the figuring-wires; Fig. 10, a separate view of the box for introducing the figuring-wire, to show its connection with the carriage to which it is attached; and Figs. 11, 12, and 13, separate sections of the box for introducing the figuring-wires, to exhibit the arrangement of parts for dropping them.

On the end of the driving-shaft V there is a miter-wheel, W, that engages with a similar wheel, X, on one end of a shaft, Y, that turns in collars Z Z of a frame, *a*, that is attached to and turns freely on the end of the driving-shaft V, to admit of the vibration of the shaft Y independently of the motion of the driving-shaft in the usual manner of making a mangle-wheel motion, the other end of the shaft being free to turn and slide in a groove, *c*, in a bracket, *d*, attached to the side of the frame, and to the extremity of this shaft is attached the mangle-pinion *b*, which acts on the external mangle-rack, *e*, to give a reciprocating rectilinear movement to a main carriage, *f*, and all the parts attached to it, the said plate sliding between ways *g g*, projecting from a plate, *h*, attached to the frame just below the breast-beam C, and projecting sufficiently beyond the frame on the right to admit of carrying the main carriage *f* and the parts attached to it out of the way during the operation of weaving. The mangle-rack at the ends is for a short distance straight and vertical, instead of being semicircular, as usual, that all the mechanism which is carried by it may remain in a state of rest for a short time at the end of each motion, while the mangle-pinion is carried up or down.

From the carriage *f* projects an arm, $h^3$, having a slot, $g^3$, in which slides a bolt, $c^3$, projecting from a secondary carriage, $b^3$, that slides in ways $e^3$ $e^3$ in a plate, $d^3$, attached to the front of the lay, so that by this connection the secondary carriage can move with the lay, and when the main carriage is moved by the mangle motion this secondary carriage is also carried with it. To the right-hand end of this secondary carriage is attached at $a^3$ a long box, $z^3$, with one end made in the form of a shuttle, to admit of its free passage between the warps, the said box having a hopper-like opening, $i^3$, at the bottom of sufficient length and width to receive and discharge through the bottom thereof a figuring-wire; but within this hopper, at equal distances apart, there are three curved arms, $l^3$, (two only are shown in the drawings,) projecting from an arbor, $z^3$, that runs the whole length of the box, and having its bearings in the ends thereof, one end of the said arbor being provided with another arm, $m^3$, jointed to an arm, $o^3$, of a short vertical arbor, $p^3$, surrounded by a helical spring, $q^3$, and provided with an arm, $r^3$, at the upper end. The tension of the helical spring always tends to turn the arbor which it surrounds to keep, by the described connections, the curved arms $l^3$ up, so as to support the figuring-wire; but when the arm $r^3$ of the vertical arbor is brought into contact with a projection, $s^3$, on the bar F of the lay, when the box $z^3$ is carried under the figuring-warps, as represented by dotted lines in Fig. 8, the curved arms are thrown open, and the figuring-wire dropped, the arms being closed by the tension of the helical spring so soon as the box is withdrawn from the open shed by the mangle motion.

The carriage *f*, which is described above, communicates motion to the box that carries the figuring-wires, also carries the pair of pinchers that withdraws the wires *z* from under the figuring-loops. A standard, *i*, projects upward from this carriage, to the upper end of which, at *m* and *n*, are jointed the two jaws *k l*, that constitute the pinchers, the two being provided with segment cogs *o p*, to insure their operating and closing together. The lower jaw, *l*, has an arm, *l'*, which, when the jaws are closed, is held under a catch, *d' r*, on the end of an arbor, *s*, carried by a standard of the carriage *f*, and around this arbor is a helical spring, *t*, which bears the catch toward the arm *l'* of the jaws, there being an arm, *v*, on the same arbor, the end of which runs on the upper edge of the plate *h*.

When the carriage is started by the mangle-pinion at the commencement of the second series of operations, the jaws are open and are carried toward the right-hand selvage of the fabric as the box with the figuring-wire moves under the figuring-warps, and when these approach the end of this motion that wire *z* which is to be drawn out from under the formed loops must be pushed partly out and toward the open pinchers. This is effected by a mechanism attached to an arm, *e'*, that vibrates on an axle, *g'*, in boxes *f' f'*, attached to the front tie-piece, B, of the frame. At the upper end of this arm there is a plate, *n'*, which is borne (by a spring of any kind or a weight that acts on the arm) against the first of a series of wires, *z*, which is to be withdrawn, several being retained under the figuring-loops to prevent the tension of the warps and the operation of the loom from drawing out the formed loops. A wedge-formed instrument, *h'*, that slides in brackets *i' i'* attached to the arm *e'* is then forced up between the wire that is to be drawn out and the one next to it by a cam, *k'*, that turns on a stud-pin, *l'*, on the arm, and the cam is vibrated to force up the wedge by a cam, *x'*, on a shaft, *y'*, that receives motion from the driving-shaft V by a train of wheels and pinions, $u^5$ $v^5$ $w^5$ $x^5$, the proportions of this train being such as to give the shaft *y'* one revolution for the complete series of motions performed by the second part of the mechanism. The cam is so formed and situated on its shaft as to elevate the wedge at the proper time by acting on a lever, *v'*, that turns on a fulcrum-pin, *w'*, and acts on a bent lever, $u'$ $s'$, that turns on a fulcrum-pin, $t'$, the said lever being connected by a rod, $r'$, with the cam $k'$. So soon as the wedge is forced up the surface of the cam $k'$ is then concentric to admit of its farther vibration without moving the wedge, the object of giving a farther vibration to the cam $k'$ being to move a lever, $m'$, that vibrates on a stud-pin, $o'$, on the same arm to force the wire $z$ toward the pinchers, that face of the lever which acts on the point of the wire being grooved for this purpose. The cam $k'$ acts on this lever to vibrate it to and fro by means of two pins, $p'$ $q'$, (shown in Fig. 5 by dotted lines,) the pins being placed so far apart as to admit of the vibration of the cam $k'$ sufficiently far to elevate the wedge before it acts on the pushing-lever, as one motion should follow the other. The operations just described, which separate and push out the figuring-wire, take place as the pinchers move toward the wire, and when the wire is introduced below the jaws of the pinchers they are closed by forcing down the arm $l'$ of the under jaw until caught and held by the catch $d'$, which is effected by a lever, $w$, that turns on a stud-pin, $y$, on a standard, $x$, this lever being connected by a jointed rod, $b'$, with one end of a lever, $s^4$, that vibrates on a stud-pin, $w'$ $t^4$, the other end of this lever being acted upon at the appropriate time to close the pinchers by a cam, $u^4$, on the shaft $y'$. The moment that the pinchers have grasped the wire, which takes place at the same time that a similar wire is dropped from the box under the figuring-warp, the mangle-pinion, during the operation of grasping the wire, passes up that portion of the end of the mangle-rack which is straight and vertical, and which, therefore, does not move the carriage that carries the pinchers and wire-box; but so soon as the wire is grasped the mangle-pinion begins to move back the carriage, and at the end of the back motion the arm $v$ of the latch of the pinchers is carried up an inclined plane, $w$, on the plate, which forces back the latch $d'$ and permits the spring $q$ to force open the jaw and liberate the wire, which falls into the transferring apparatus, which will now be described. There is a sliding standard, $e^2$, which slides vertically in brackets $f^2$ $f^2$, attached to the side of the frame, and to the top of this standard is attached a horizontal top piece, $d^2$, with the ends $c^2$ $c^2$ bent down, to receive the journals of two small arbors, $b^2$ $\bar{w}$, to which are attached, near each end, curved fingers $a^2$ $\bar{a}$ and $z^2$ $\bar{z}$—two at each end—their hubs being provided with cogs $o^2$, that engage each other, so that by turning one of the arbors by an arm, $p^2$, attached to it, the two pairs of fingers can be made to open and close. The outer end of the arm $p^2$ is connected by a jointed rod, $q^2$, with one end of a lever, $r^2$, that vibrates on a stud-pin, $i^2$, the other being provided with a roller, $s^2$, to receive and communicate motion to the parts in connection from a cam $t^2$, on the shaft $y'$, and attached to the face of another cam, $m^2$, which acts upon a roller, $k^2$, on the end of another and similar lever, $h^2$, on the same stud-pin, the other being provided with a roller, $g^2$, on which the lower end of the standard $e^2$ rests, and by which it is elevated and permitted to descend.

To the lever $h^2$ there is jointed a pendent catch, $v^2$ $w^2$, which catches onto a projection, $x^2$, on the other lever, $r^2$, for the purpose of connecting and disconnecting the two levers at given periods in the operation of the mechanism.

During the operation of introducing and withdrawing the wires the two levers are disconnected, and the standard $e^2$ is kept at the highest position by the roller on the lever that operates it, being acted upon by that part of the cam-wheel $m^2$ which is concentric, and the fingers are kept open by the preponderance of the parts on that end of the lever $r^2$ connected with the fingers. The parts being thus situated as the pinchers approach their drawing-out movement the standard, with the fingers opened, begins to descend by the rotation of the cam $m^2$, the depression $n^2$ in which passes the roller $k^2$, and permits that end of the lever $h^2$ to rise by the weight of the standard, &c., resting on the other end; and as the standard descends the points of the opened fingers pass below the wire in the pinchers, and then the cam $t^2$ acts on the roller of the lever $r^2$ and closes the fingers under the wire, which is dropped into them by the opening of the pinchers, and the wire is there held by connecting the two levers together by the catch $v^2$ $w^2$. The parts remain in this situation until the driving-belt is shifted back from the driving-pulley U of the second part of the mechanism to the driving-pulley R of the first part, which is effected as described above. This sets in motion the weaving-in operation, and the first beat of the lay brings the box which conveys the wire under the figuring-warp under the fingers, and at the same time a projection, $y^2$, on the sword G of the lay liberates the catch $v^2$ $w^2$, and permits the lever $r^2$ to descend and open the fingers to drop the wire into the box preparatory to the next operation of introducing the wire under the figuring-warp. After the driving-power has been shifted back to the weaving in or first part of the mechanism, the jacquard-frame is operated by the cam $m^5$ and its connections to let down the figuring-warps that were thrown up to form the figuring-loops that they may be woven in, and when the lay has been made one beat for this purpose the comber-board is elevated to lift the figuring-warps out of the way of the operations of the linen or foundation warps, as above described.

From the foregoing it will be obvious that the parts of this mechanism which I claim as my invention can undergo many modifications without changing the principle of my invention—as, for instance, instead of using the mechanism above described for shifting the belt from one driving-pulley to the other, a clutch may be substituted, or any other arrangement of mechanical means, which will shift the belt from one to the other, or clutch and unclutch the parts, the object being to start one part of the mechanism as the other is arrested, a brake being used for each separate organization, so that the moment the driving power is shifted the brake shall act to arrest the momentum of the moving parts. Again, instead of using fingers that open and close to receive and deliver the figuring-wires, hooked arms may be employed and connected with an arbor, so that they can turn to pass under the wire to receive it from the pinchers, and in like manner turn to drop it into the box, which carries it under the figuring-warps; and instead of the hopper and shuttle-formed box for receiving, holding, and introducing the wires, arms such as are employed in the box to close and open the bottom for the delivery of the wire may be used without the box by giving them a greater curve, as the main object is to give the wire ample support as it passes between the warps; but, notwithstanding all the modifications of which my invention is susceptible, the mode fully described and represented of applying the principles or characteristics of my invention, which distinguishes it from all other things before known, I deem the best, my object in referring to the others being simply to show that I have contemplated other modes. It will also be obvious that any of the parts of my invention above described may be employed without the others by performing the other required operations by other means—as, for instance, the first part of my invention, which operates the two parts of the machinery by a separate organization of mechanism so combined together that the driving-power can be shifted from the one to the other, can be beneficially employed without reference to the mode of removing the figuring-wires from the woven pile, of transferring them to the box or trough for their reception, and of supporting them between the open figuring-warps; for, however these operations or functions are effected, whether by machinery or by hand, all the advantages due to the first part of my invention will be attained. So of the second part of my invention. The advantages derived from the use of a box, trough, or any equivalent receptacle so placed as to receive and hold the figuring-wires in the proper place preparatory to their being transferred to the required place in the open shed of the figuring-warps, will be manifest, and this can be employed irrespective of the mode of depositing the figuring-wires and introducing them in the open shed of the figuring-warps, whether these latter operations are performed on the principle of the third and fourth parts of my invention or by hand. So of the third part of my invention, for the figuring-wires can be transferred from any apparatus which delivers them from the figuring-loops to any apparatus which may transfer them between the open shed. So of the fourth part of my invention, as the method of introducing the figuring-wires in the open shed of the figuring-warps is irrespective of the methods of performing the other operations, so long as the figuring-wires are supplied one by one to this apparatus to be introduced; and, finally, it will be obvious that giving support to the figuring-wires while being introduced in the open shed of the figuring-warps is irrespective of the modes adopted for performing the other operations or functions, and that the object of giving support to the figuring-wires will be attained to a greater or less extent, whether the said support be employed for the additional purpose of carrying in the figuring-wires, or the wires be introduced in the open shed by being moved over the support; and although I have stated that the various parts of my invention may be employed each separately from the others by performing the required functions by other mechanical means or by hand, still it is believed that the best results will be attained by the combined use of the whole.

The box or trough for receiving the figuring-wires preparatory to their being introduced may be made of any desired form adapted to their reception and support, so far as it is employed for the sole purpose.

Having thus declared the nature or character of my invention, specified the construction and operation thereof, and pointed out the various modes in which I have contemplated the application of the several principles,

What I claim as my invention, and desire to secure by Letters Patent, is—

1. Giving to the two parts of the mechanism—that which weaves the cloth or forms the body of the fabric and the one which operates the figuring-wires—a separate and distinct organization, substantially as described, when these are connected and confined by an intermediate mechanism which shifts the motive or driving power from one to the other, substantially as described, and in combination with this, the employment of the two brakes to arrest the momentum of the moving parts, to prevent any conflict in the operations of the two parts of the mechanism.

2. In combination with a loom for weaving such looped fabrics, as herein designated, the employment of a box, trough, or the equivalent thereof for receiving and holding the figuring-wires preparatory to their being introduced under the figuring-warps, substantially as described.

3. The fingers or their equivalents, which receive the figuring-wires from under the pile or figuring-loops, in combination with the trough, box, or the equivalent thereof into which thay are deposited preparatory to the introduction of them under the figuring-warps, substantially as described.

4. In combination with the mechanism which withdraws the figuring-wires from under the pile or figuring-loops, the fingers or their equivalent for transferring the said wires to the trough or the equivalent thereof, from which or by which they are transferred to the open shed of the figuring-warps, substantially as herein described.

5. The method, substantially as herein described, of introducing and dropping the figuring-wires in the open shed of the figuring-warps, as described.

6. The method, substantially as herein described, of supporting the figuring-wires in the open shed of the figuring-warps, when they are being introduced, as described.

E. B. BIGELOW.

Witnesses:
J. WHITNEY,
A. P. BROWN.